United States Patent [19]

Schultz

[11] 4,163,235

[45] Jul. 31, 1979

[54] SATELLITE SYSTEM

[75] Inventor: Jack L. Schultz, Huntington, N.Y.

[73] Assignee: Grumman Aerospace Corporation, Bethpage, N.Y.

[21] Appl. No.: 828,488

[22] Filed: Aug. 29, 1977

[51] Int. Cl.² .......................... H01Q 3/26; H04B 7/14
[52] U.S. Cl. .............................. 343/100 SA; 325/14; 343/100 ST; 343/100 TD
[58] Field of Search ................. 343/100 SA, 100 TD, 343/100 ST, 854, 915, DIG. 2; 325/14

[56] References Cited

U.S. PATENT DOCUMENTS

| | | | |
|---|---|---|---|
| 2,986,734 | 5/1961 | Jones et al. | 343/100 SA X |
| 3,305,864 | 2/1967 | Ghose | 343/100 TD |
| 3,406,401 | 10/1968 | Tillotson | 343/100 SA X |
| 3,739,538 | 6/1973 | Rubin | 343/DIG. 2 X |
| 3,750,175 | 7/1973 | Lockerd et al. | 343/100 SA |
| 4,030,102 | 6/1977 | Kaplan et al. | 343/915 |

Primary Examiner—Maynard R. Wilbur
Assistant Examiner—Richard E. Berger
Attorney, Agent, or Firm—Bruce B. Brunda; Richard G. Geib

[57] ABSTRACT

An antenna for radio frequency signals including a two flat faced phased arrays and ground plane system therebetween where transmission lines join the antenna planes to electronic control packages such that there is provided proper phase shift, final amplification and timing for retransmission by one of the antenna planes in a preselected direction, and where the signals are space fed to the other antenna plane by a feed system.

9 Claims, 9 Drawing Figures

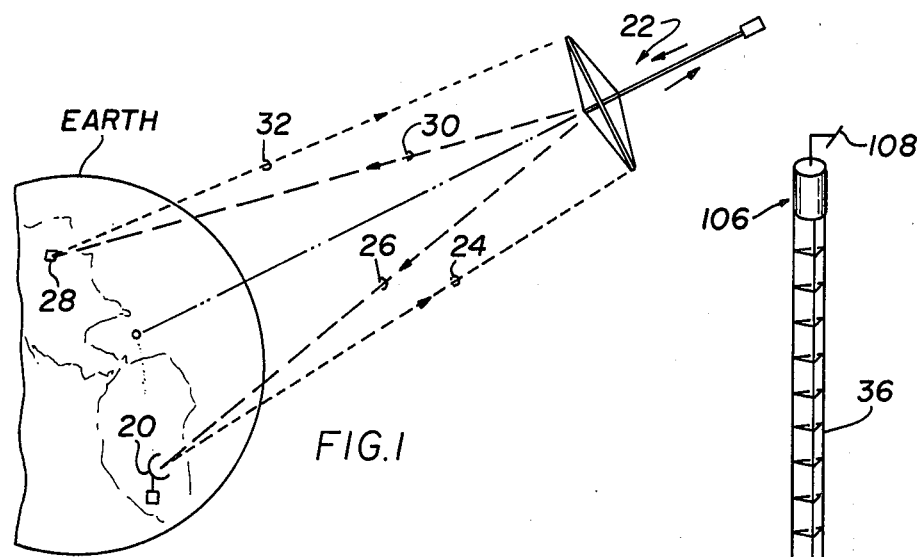
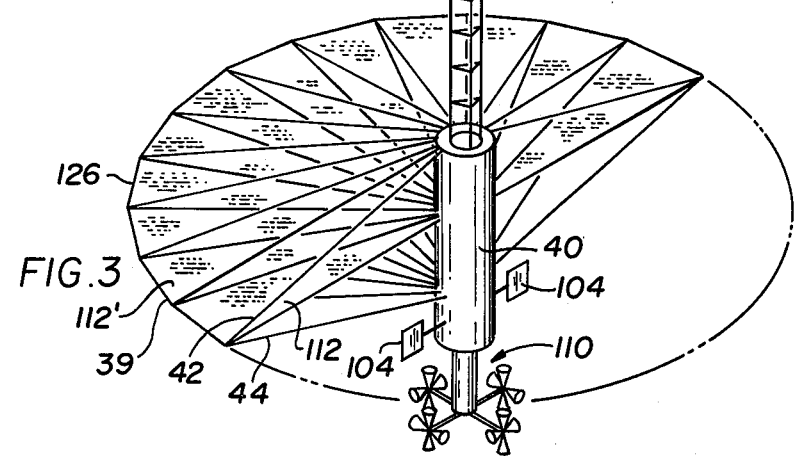
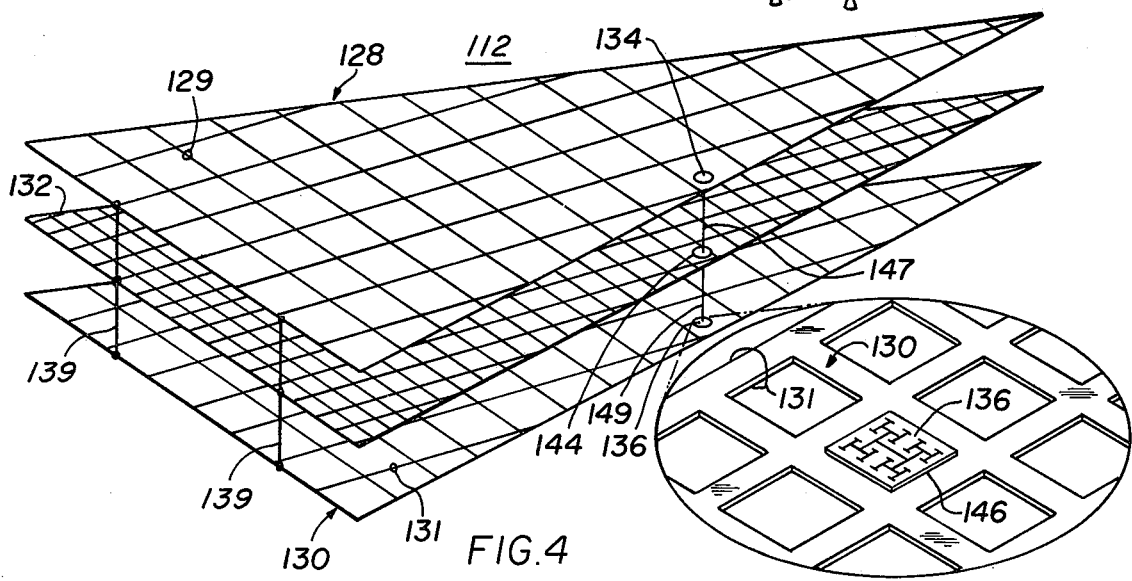

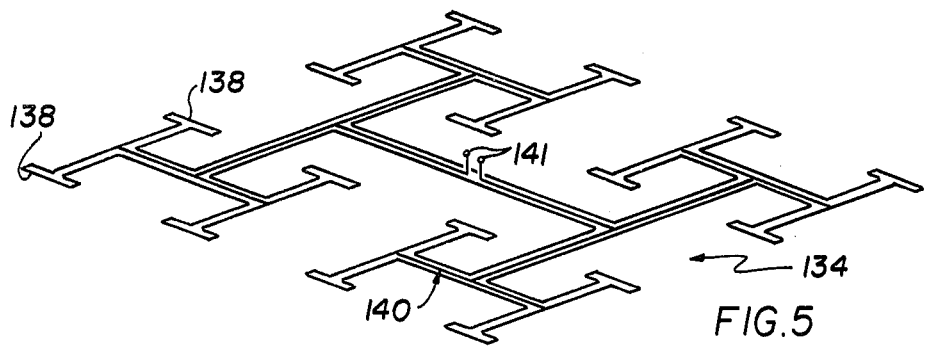
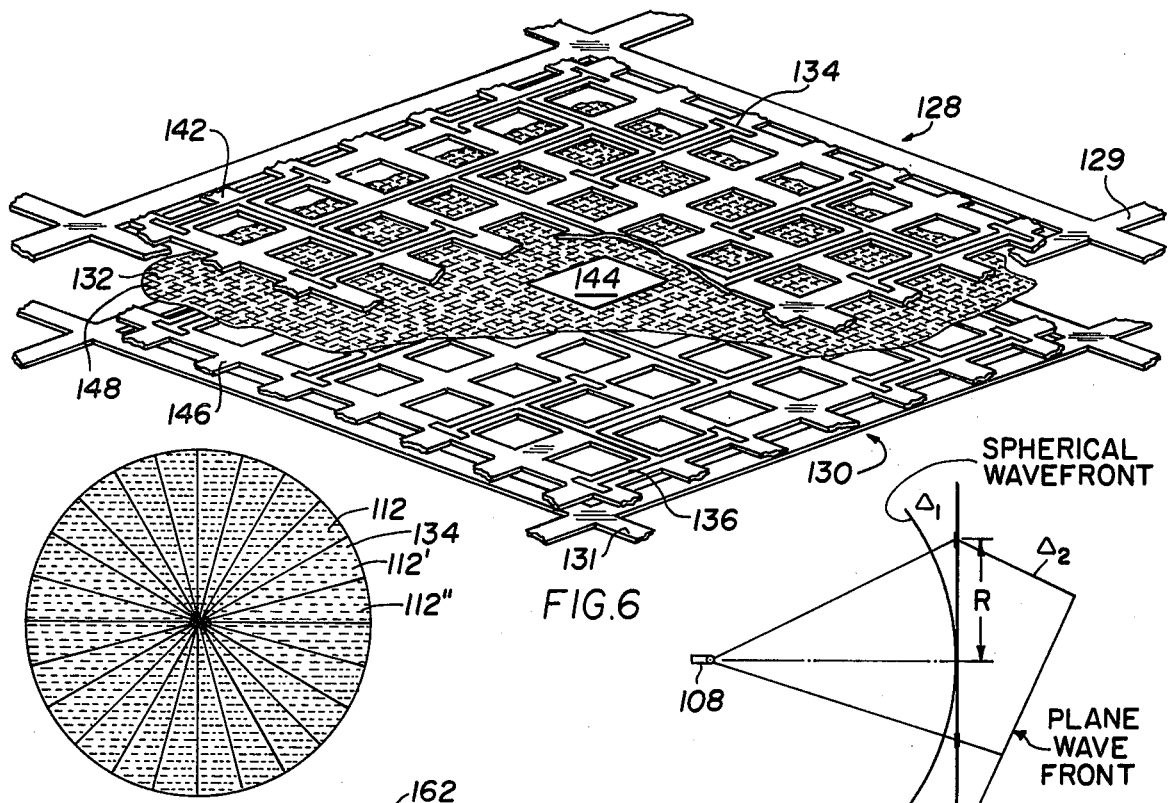
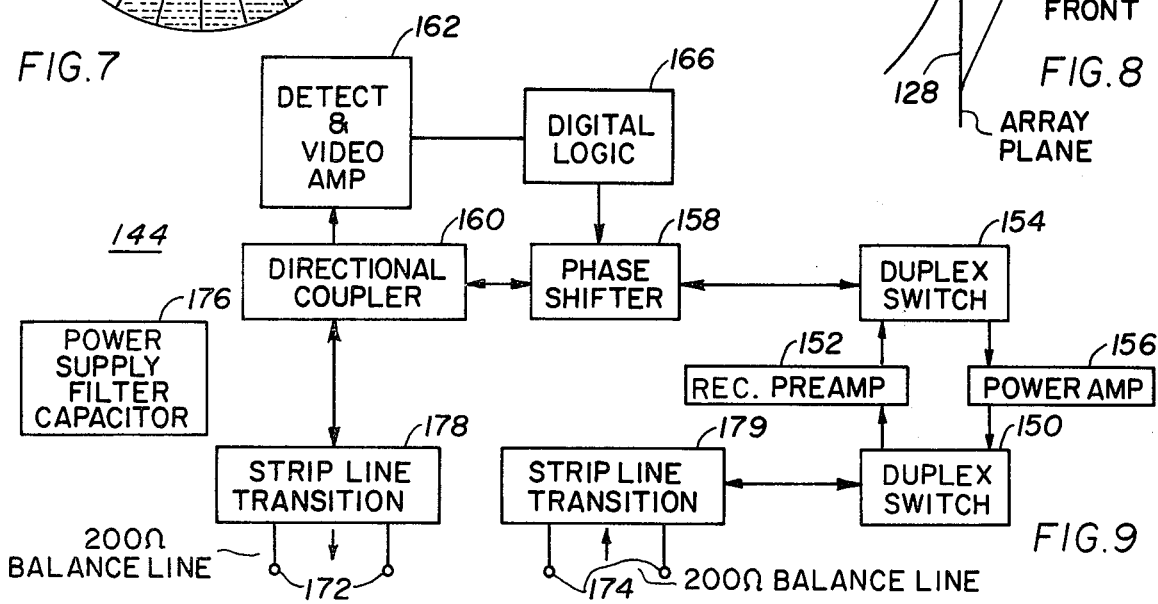

SATELLITE SYSTEM

FIELD OF INVENTION

This invention relates to a radar or communication satellite system where signals may be received and retransmitted in predetermined controlled directions.

BACKGROUND

It has been noted that the prior art is suggestive of a steerable antenna communication system having decision apparatus responding to a predetermined signal (coded or otherwise) to phase shift elements of an antenna so that a received beam may be retransmitted in any specified direction. Such is shown by U.S. Pat. No. 3,305,864 and it accomplishes the object set forth by a reflecting array that is modified so as to transmit in a direction other than opposite that from which the signal is received.

Other examples of prior art structure related to this invention is that described by U.S. Pat. No. 3,553,693. There one is taught how to use a common computer to control a series of phase shifters with wired commands for separate receive and transmit arrays.

SUMMARY

This invention relates to radar or communication satellite systems, especially those operating in Earth equatorial orbit at an altitude of approximately 19,300 n mi such that the orbit time is 24 hours and the satellite is nearly stationary in Earth coordinates, i.e. remaining over a nearly fixed point on the equator, having as a principal object of the invention a store-and-forward system for radio signals that are transmitted to the satellite system from a source of signals such as an Earth station, or another satellite, and which will permit signals arriving from one direction to be retransmitted in one or several different directions.

Another object of the invention is to provide a narrow, directional receiving and transmitting antenna beam capable of being directed at the source of signals for reception and further capable of being redirected in one or several new directions for retransmission of the signals.

A further object of the invention is to provide storage of the received signals between reception and retransmission, and electronic control of the direction of the receiving and transmitting antenna beam, by command from the source of signals, in such a manner that the source of signals can command the satellite to retransmit the stored signals in any desired new direction, as for example toward a receiving system at another point on Earth or in space.

A still further object of the invention is to provide a satellite system such that it is of small size when launched into space from Earth and has a large area (which is required to provide the desired narrow antenna beam width) when deployed or unfurled in space yet is lightweight when measured in pounds per square foot.

DRAWING DESCRIPTION

FIG. 1 is a schematic illustration of one method of utilization for this invention;

FIG. 3 is an isometric showing the satellite relay in overall arrangement;

FIG. 4 is an isometric view of a portion of FIG. 3 in enlarged detail;

FIG. 5 is a further enlargement of a detail of FIG. 4 showing a typical subarray radiating element;

FIG. 6 is an enlargement of a detail of FIG. 4 showing portions of the three layered sector which supports the subarray of FIG. 5;

FIG. 7 illustrates the configuration of arrays of the antenna;

FIG. 8 illustrates some of the geometry involved in this invention, and

FIG. 9 is a schematic block diagram of the elements in an electronic module used in this invention.

DETAILED DESCRIPTION

Figure 2:
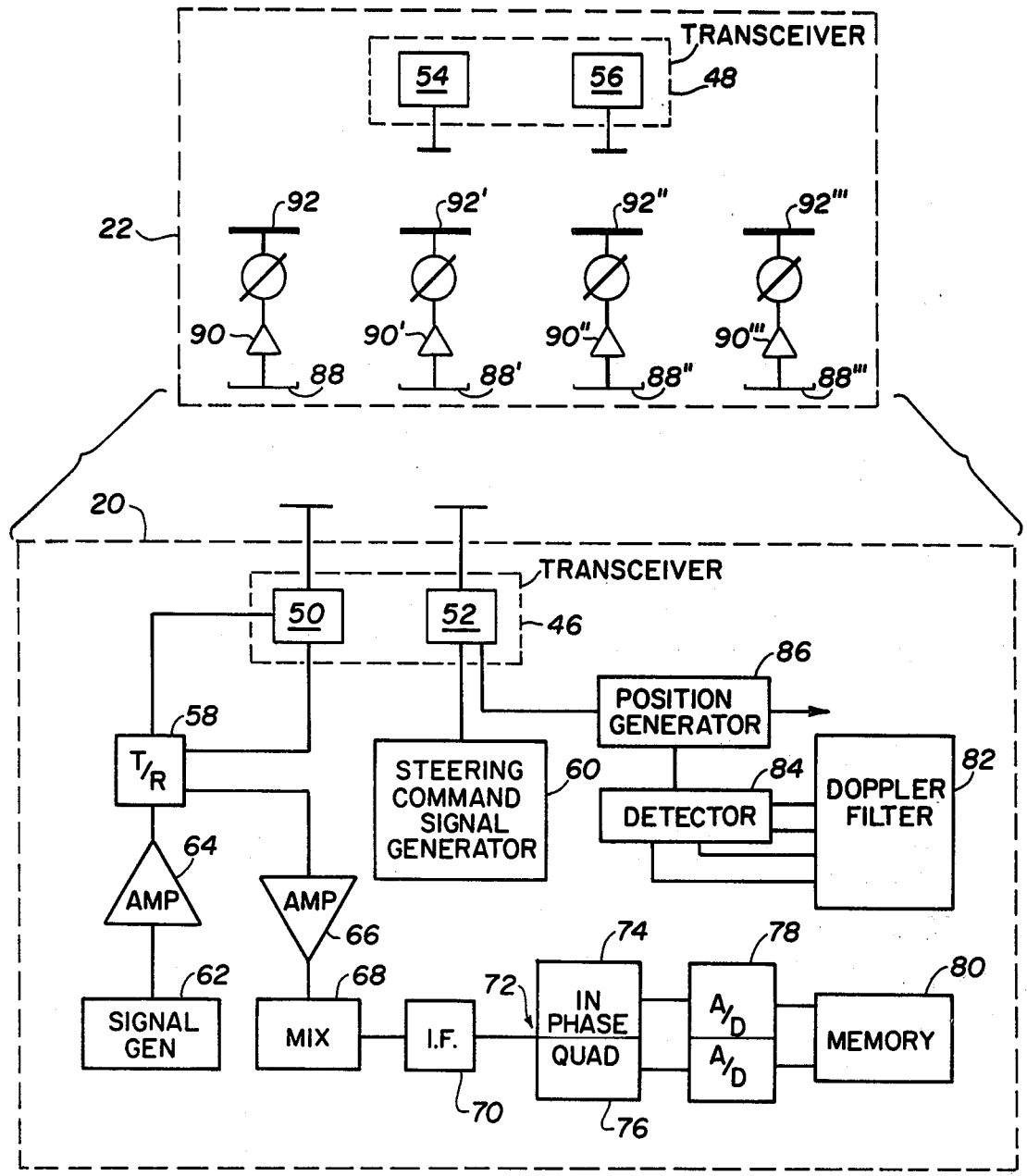
FIG. 2 is a block diagram of a portion of a system having utility with the example of FIG. 1.

With reference to FIG. 1 there is shown the utility for this invention where a ground based radar system 20 has communication with a relay satellite 22 constructed to include this invention by way of uplink 24 and downlink 26. In turn the satellite can, with this invention, probe other ground based areas such as that with a target 28 by means of a radar transmitter pulse link 30 and a radar echo link 32.

FIG. 2 shows a communication system between ground 20 and remote station 22. Specifically there is shown a time sharing transceiver 46 and a time sharing transceiver 48, as is readily available to one skilled in the art, for communicating between ground station 20 and remote (space) station 22. As will be readily appreciated by one skilled in the art the ground station 20 has within transceiver 46 a radar radio network 50 and a guidance or command radio network 52. Similar radar 54 and command 56 radio networks are in transceiver 48, both transceivers 46 and 48 being of the time sharing concept known in the art.

In control of the radar communication is transmit/receive network 58, and in control of command communication is a beam steering command signal generator 60.

As may be appreciated by those skilled in the art, the radar signals emanate from a pulsed signal generator 62 through a driver amplifier 64 to the transmit/receive switch 58 and thence to network 50 for transmission to station 22. Signals received from station 22 will be switched via switch 58 to a receiver amplifier 66, fed to a mixer 68, an IF network 70 and thence to a detector 72, provided with an in-phase detector 74 and a quadrature detector 76 processing respective signals to an analog to digital converter 78. From the converter 78 the signals are directed to a memory circuit 80 thence to a Doppler filter 82 to be thence processed by a detector network 84 for delivery to a target position generator 86 which also receives down link commands via radio link portion 52.

The radio signals between transceivers 46 and 48 are processed through a plurality of phased array elements 88, 88', 88'', etc., phase shift and amplifying transmission apparatus 90, 90', 90'', etc., and the phased array elements 92, 92', 92'' of the relay satellite 22 as will be further detailed hereinafter. With reference now to FIGS. 3 through 9 the preferred structure of this invention may be more specifically realized. In FIG. 3 there is shown a deployed structure 22 having a rim element 39 with forestays 42 and backstays 44 emanating from cannister hub 40. Solar arrays 104 power the structure via a control module 106 containing transceiver 48 (see FIG. 2) on mast 36. Between the rim 39 and hub 40 are a plurality of gores or sectors 112, 112', etc. each of which is one piece of an overall circular support plane 126 for the antenna system. Thrusters 110 provide attitude keeping and control for this structure keeping the plane 126 substantially perpendicular to an earth's radius. The structure of FIG. 3 is all packaged in and around the cannister 40 before launching into space and deployed into the configuration shown. The mast 36, for example may be twisted and telescoped into the cannister in any preferred manner, and the sectors 112 folded like an umbrella and wrapped around the cannister. The particular packaging employed is not a part of the present invention except that the apparatus must be capable of deployment in space. Suitable packaging means are shown in U.S. Pat. No. 4,030,102 entitled "Deployable Structure" and assigned to the common assignee hereof.

As seen in FIG. 4 a typical antenna sector 112 is comprised of an upper antenna plane 128, a lower antenna plane 130, and a ground plane 132 between the two. The antenna planes 128 and 130 are spaced away from the ground plane 132 by a distance of one quarter wave length of the operating frequency of the satellite system. The spacing between the planes is maintained by a hinge system provided by links 139 for example hinged to planes 128, 130, 132 so as to permit them to be flattened against each other, and rolled up on the cylindrical hub 40 for storage. The antenna planes 128 and 130 are covered with a plurality of radiating elements or antenna subarrays of which subarrays 134, 136 are typical. The subarrays 134, 136 are each electrically connected to an electronic module 144 supported on ground plane 132 by transmission lines 147, 149. The inset in FIG. 4 illustrates how one subarray 136 may be located in each opening or aperture of the aluminum mesh 131 of the lower antenna plane 130. The preferred construction, however, is shown in more detail in FIG. 6, and will be described in connection therewith in the following paragraph.

FIG. 5 shows the typical subarray 134 in detail wherein a plurality of wire dipoles 138 (sixteen in FIG. 5) are connected together by transmission lines 140. The interconnected dipoles 138 are energized from, or feed into, as the case may be, the terminals 141. Each subarray like that of FIG. 5 is supported, as seen in FIG. 6, on a portion of the thin electrically non-conducting open mesh 142 (partly broken away to show module 144 which in turn is supported by the coarse mesh of aluminum 129 of which the antenna plane 128 is made. Also shown in FIG. 6 is the similar subarray 136 placed on the non-conducting support 146 of lower antenna plane 130 in turn supported on the coarse mesh of aluminum 131 of antenna plane 130. Between the two, a significantly finer mesh of electrically conducting material 148 comprises the ground plane 132 and supports module 144 thereon. As previously mentioned, the spacing between planes 128, 130, 132 is preferably equal to one quarter of the wavelength of the operating frequency of the satellite. Incidentally the wavelength also dictates the dimensions of the dipoles and thereby the dimension of the mesh supports for the dipole arrays, as will be evident to the designer.

The ground plane 132 supports an electronic module 144 for each pair of subarrays 134, 136. The module 144 is connected by balanced transmission lines 147 and 149 (FIG. 4) to the terminals 141 (see FIG. 5) of subarray 134 and similar terminals on subarray 136.

It is expected that each antenna sector 112 will have thousands of these subarrays 134, 136 with the corresponding electronics modules 144 thereon perhaps as many as a million all together. Preferably in each sector 112 the dipoles 138, as shown in FIG. 5, all are aligned to be parallel with each other and with the dipoles in every other sector 112', 112" etc. in the antenna plane as illustrated in FIG. 7 where the dash symbol signifies the orientation of the dipoles.

With reference again to FIG. 2, the elements 88, 88' etc. correspond to subarrays 134, the apparatus 90, 90' etc. correspond to the modules 144 and the elements 92, 92' etc. correspond to the subarrays 136. The orientation of the arrays 134 of the upper plane 128 are not necessarily the same as the orientation of the arrays 136 on the lower plane 130.

FIG. 9 shows, as a block diagram, the electronic elements in module 144 and their interconnections. The module is preferably a micro-circuit on a ceramic base to which the upper antenna elements 134 are connected to terminals 172 and lower antenna elements 136 are connected to terminals 174. Signals received at 174 (from a remote station) are processed through switch 150, receiver 152 switch 154 phase shifter 158, directional coupler 160 to terminal 172 and thence to antenna elements 134 which space feed the signals to the receiver-transmitter 48 (FIG. 2). Signals transmitted from transceiver 48 are received at elements 134 processed through terminals 172, through directional coupler 160, into both detector and video amplifier 162, digital logic 166, and phase shifter 158, switch 154, power amplifier 156 switch 150 terminals 174 to antenna elements 136 for transmission to a second remote station. As well understood, the power supply and filter capacitor network 176 on the module 144 supplies power to the various elements for short pulse, high power operating and strip line transition circuits 178, 179 are provided between the terminals 172, 174 respectively and the rest of the circuit of FIG. 9. In operation, this structure functions as a space fed remotely controlled, electronically steered, phased array system to receive and transmit radio signals. The antenna phased array system, in conjunction with the feed receiver transmitter forms a narrow beam in space that can be used for transmitting or receiving. Radio frequency signals transmitted to the satellite relay system from a remote station within the narrow beam are received at the antenna elements 136 fed through electronic module 144 to antenna elements 134 and thence space fed to the transmitter-receiver 48.

In the state-of-the-art electronics associated with transceiver 48 the received signals are converted to an intermediate frequency, delayed in a delay line, reconverted to the same or a different radio frequency, and then transmitted to antenna elements 134. From there the signal is fed through the electronics 144 to antenna elements 136 and thence retransmitted to another remote location.

While the received signal is in the delay line, the narrow beam is switched to point in the direction of a new remote location where it is desired that the signals be received, as will be described.

The direction switching commands, as received at terminal 172, may be multiple commands, including timing commands, that cause the signals to be retransmitted sequentially in many different narrow beams to many remote locations. This is accomplished by the module 144 where the digital logic chip 166 performs four functions in response to input data from detector 162, which input data are part of the radio frequency signal transmitted to the elements 92 (FIG. 2) from transceiver 48. The first function is to calculate commands for phase shifter 158 which is accomplished within the logic of the integrated circuit logic chip 166 by multiplying the beam steering command by a number stored in the memory of the chip and storing the result. The second function is to store the part of the data (timing data) that directs the timing of the transmit-receive switching, phase-shift and on-off keying operations. The third function is to count a precise internal clock in the logic and generate timing pulses in accordance with the timing data. The fourth function is to generate output signals, at the times of occurrence of the timing pulses, on several output lines to control the phase shifters, the transmit-receive switches, the transmitter, and receiver.

In summary, during transmit periods in each of the many modules 144 the transmit/receive switches 150, 154 are operated to their transmit position to switch the transmitter on amplifier and the phase shifter 158 is pulsed or set to the desired phase shift by digital logic 166. The signal to be transmitted is radiated by transceiver 48 by feed 108 (FIG. 3), received by subarrays in antenna plane 128, phase shifted, amplified, and transmitted by the subarrays in antenna plane 128, phase shifted, amplified, and transmitted by the subarrays in antenna plane 130. During receive periods the transmit/receive switches 150, 154 are operated in the receive position to switch the receive amplifier on, and the phase shifter 158 is pulsed to the desired phase shift by the digital logic 166. The signal from antenna plane 130 is now fed through receive amplifiers 152 and phase shifter 158 to be reradiated by subarrays in antenna plane 128 to the transceiver 48 via feed 108.

In applying the above described satellite system to communication, the message is received, stored and retransmitted as described. In applying the above described system to radar the radar "transmitter" signal is first received by the satellite system from an external source such as a ground station which generates the desired signal waveform and transmits it to the satellite system. The satellite system receives the signal, stores it, and retransmits it toward the target. The satellite system then receives radar echoes from the target, stores them, and retransmits the echoes to the ground station. Thus the satellite system acts as part of an overall radar system by selectively pointing its narrow beam toward the ground station and the radar target, and relaying signals in both directions.

As seen by FIG. 8 each array on plane 128 is addressed by the spherical wavefront from transceiver 48 through feed 108 at slightly different times. The array structure of this invention converts the spherical to plane wavefront so that it can be reradiated into a desired direction. It is normally desired to go off-axis with the reradiation, i.e. tilt vertically and/or horizontally and this is accomplished in electronic module 144.

In each module 144 the read only memory of logic 166 has inserted in it the predetermined X and Y coordinates for the location of the antenna array 134 (See FIG. 7) to which it is connected, and a distance corresponding to the angle of the spherical wavefront $\Delta_1$ at such coordinates. The module also receives in operation an elevation steering angle $\phi$ command signal and an azimuth steering angle $\theta$ command signal. The module then computes and establishes a distance corresponding to the plane wavefront angle $\Delta_2$ by the relationship:

$$\Delta_2 = [(\sin \theta)X + (\sin \phi)Y]$$

which will command the desired in phase shifter 158 for the plane wavefront transmission. In such apparatus there will be designed in the ability for the phase shifter to provide delays in the range of 0 to 1 wavelength ($\lambda$).

As will be readily appreciated one could use a circularly polarized subarray as may be formed by a double Archimedes spiral or one could use crossed dipoles fed to provide circular polarization.

Having described an operative arrangement for this invention it is now desired to set forth the invention by the following claims:

I claim:

1. A communication relay in space for receiving and transmitting electromagnetic energy, said relay comprising a phased array antenna system including:
   a first plurality of independent subarrays on a first plane,
   a second plurality of independent subarrays on a second plane,
   a common ground plane between said first and second planes,
   a plurality of amplifier-and-phase-shift modules,
   electrical connections connecting each of said modules to a corresponding one of said first plurality of subarrays and to a corresponding one of said second plurality of subarrays,
   switching means in each of said amplifier-and-phase-shift modules for regulating the flow of energy between said first and second plurality of subarrays,
   transceiver means for transmitting electromagnetic energy at certain times and receiving electromagnetic energy at other times,
   said first plurality of subarrays being space fed by said transceiver means during said transmitting times, said second plurality of subarrays being energized from said first plurality of subarrays through said amplifier-phase-shift modules for radiating energy to a remote location, and
   said second plurality of subarrays receiving electromagnetic energy from a remote location during said receiving times, said first plurality of subarrays being energized from said second subarrays through said amplifier-phase-shift modules for radiating energy to said transceiver means.

2. The device of claim 1 wherein the phase shift introduced during transmission time by each module is preselected according to the position of the corresponding subarrays in the phased array and the direction of the remote location whereby the radiated energy is focussed into a beam directed at the remote location.

3. A satellite system that functions as a communication system that stores and forwards radio signals, consisting of:
   a foldable rim assembly of many rim elements that deploys an equal number of triple-layer gores and also deploys stays that with the central drum form a rigid structure,
   a deployable central mast that carries an antenna feed system and electronics, capable of receiving, delaying and retransmitting signals,
   gores that have a central ground plane and two antenna planes spaced one-quarter wavelength more or less on each side of the central ground plane, radiating antenna elements such as dipoles in each antenna plane connected together in subarrays and each subarray connected to an electronic module which contains transmitting and receiving amplifiers, a phase shifter, transmit-receive switches and digital logic that responds to radio signals to command the operation of the electronic module.

4. The satellite system of claim 2 interposed between a radar station and a radar target for relaying signals from said station to said target and back again.

5. An antenna system in space for receiving and transmitting electromagnetic wave energy comprising a space fed phased array system including:
   first and second broadside arrays of radiating elements, one of said arrays on each side of a common ground plane, said first array being operative to receive and transmit signals between the system and a ground location,
   electronic phase control means electrically connected between said broadside arrays for transmitting electrical signals between said arrays and for varying the relative phase of the signal in response to a remote control signal,
   a remote command module located at some distance from said arrays and operative to receive an electromagnetic signal from said second array, derive electronic steering commands therefrom and to transmit said steering command to said second array in order to control the operation of said phase control means.

6. The system as recited in claim 5 wherein said first broadside array comprises a plurality of subarrays spaced from said ground plane by a distance of one quarter wave length at the operating frequency of the system.

7. The system as recited in claim 5 wherein said second broadside array comprises a plurality of subarrays spaced from said ground plane by a distance of one quarter wave length at the operating frequency of the system.

8. The system as recited in claim 6 wherein said phase control means comprises integral microcomputer modules, one of said modules being associated with each of said subarrays.

9. The system as recited in claim 7 wherein said phase control means comprises integral microcomputer modules, one of said modules being associated with each of said subarrays.

* * * * *